United States Patent
Xiong

(10) Patent No.: US 12,505,627 B2
(45) Date of Patent: Dec. 23, 2025

(54) SYSTEM AND METHOD FOR DISOCCLUDED REGION COMPLETION FOR VIDEO RENDERING IN VIDEO SEE-THROUGH (VST) AUGMENTED REALITY (AR)

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 18/353,610

(22) Filed: Jul. 17, 2023

(65) Prior Publication Data

US 2024/0078765 A1    Mar. 7, 2024

Related U.S. Application Data

(60) Provisional application No. 63/402,584, filed on Aug. 31, 2022.

(51) Int. Cl.

| | | |
|---|---|---|
| *G06T 19/00* | (2011.01) | |
| *G06F 3/14* | (2006.01) | |
| *G06T 5/77* | (2024.01) | |
| *G06V 10/25* | (2022.01) | |

(52) U.S. Cl.
CPC .............. *G06T 19/006* (2013.01); *G06F 3/14* (2013.01); *G06T 5/77* (2024.01); *G06V 10/25* (2022.01)

(58) Field of Classification Search
CPC .. G06V 10/25; G06F 3/14; G06T 5/50; G06T 5/77; G06T 19/006; G06T 2207/10028; G06T 2207/10016; G06T 2207/10024
See application file for complete search history.

(56) References Cited

U.S. PATENT DOCUMENTS

| | | | |
|---|---|---|---|
| 9,076,249 B2 | 7/2015 | Chen et al. | |
| 10,930,054 B2 | 2/2021 | Zhang | |
| 2013/0127844 A1 | 5/2013 | Koeppel et al. | |
| 2014/0002591 A1* | 1/2014 | Wenxiu | G06T 5/77 |
| | | | 348/42 |
| 2017/0061693 A1* | 3/2017 | Kohler | G06T 19/006 |
| 2018/0158246 A1* | 6/2018 | Grau | G06T 3/18 |

(Continued)

OTHER PUBLICATIONS

Tian et al., "Quality assessment of DIBR-synthesized views: An overview", arXiv:1911.07036v2 [eess.IV], Apr. 2021, 31 pages.

*Primary Examiner* — Xilin Guo

(57) ABSTRACT

A method includes generating a virtual view image and a virtual depth map based on an image captured using a see-through camera and a corresponding depth map. The virtual view image and the virtual depth map include holes for which image data or depth data cannot be determined. The method also includes searching one or more previous images to locate a region in at least one previous image that includes missing pixels in the holes. The method further includes at least partially filling the holes in the virtual view image and the virtual depth map with image data and depth data associated with the located region to generate a filled virtual view image and a filled virtual depth map. In addition, the method includes generating a virtual view to present on a display panel of a VST AR device using the filled virtual view image and the filled virtual depth map.

20 Claims, 10 Drawing Sheets

(56) References Cited

U.S. PATENT DOCUMENTS

| | | | |
|---|---|---|---|
| 2018/0357813 A1* | 12/2018 | Hong | ................... G06T 7/90 |
| 2019/0206119 A1 | 7/2019 | Nam et al. | |
| 2022/0159196 A1 | 5/2022 | Lee | |
| 2022/0180473 A1* | 6/2022 | Eble | ................. H04N 7/014 |

\* cited by examiner

SYSTEM AND METHOD FOR DISOCCLUDED REGION COMPLETION FOR VIDEO RENDERING IN VIDEO SEE-THROUGH (VST) AUGMENTED REALITY (AR)

CROSS-REFERENCE TO RELATED APPLICATION AND PRIORITY CLAIM

This application claims priority under 35 U.S.C. § 119(e) to U.S. Provisional Patent Application No. 63/402,584 filed on Aug. 31, 2022, which is hereby incorporated by reference in its entirety.

TECHNICAL FIELD

This disclosure relates generally to augmented reality (AR) systems and processes. More specifically, this disclosure relates to a system and method for disoccluded region completion for video rendering in video see-through (VST) AR.

BACKGROUND

Augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

SUMMARY

This disclosure provides a system and method for disoccluded region completion for video rendering in video see-through (VST) augmented reality (AR).

In a first embodiment, a method includes generating a virtual view image and a virtual depth map based on an image captured using a see-through camera and a depth map corresponding to the image. The virtual view image and the virtual depth map include holes for which image data or depth data cannot be determined based on the image and the corresponding depth map. The method also includes searching one or more previous images captured using the see-through camera or one or more other see-through cameras to locate a region in at least one of the one or more previous images that includes missing pixels in the holes. The method further includes, in response to locating the region, at least partially filling the holes in the virtual view image and the virtual depth map with image data and depth data associated with the located region to generate a filled virtual view image and a filled virtual depth map. In addition, the method includes generating a virtual view to present on a display panel of a VST AR device using the filled virtual view image and the filled virtual depth map.

In a second embodiment, a VST AR device includes at least one display panel and multiple see-through cameras. The electronic device also includes at least one processing device configured to generate a virtual view image and a virtual depth map based on an image captured using one of the see-through cameras and a depth map corresponding to the image. The virtual view image and the virtual depth map include holes for which image data or depth data cannot be determined based on the image and the corresponding depth map. The at least one processing device is also configured to search one or more previous images captured using the one of the see-through cameras or another of the see-through cameras to locate a region in at least one of the one or more previous images that includes missing pixels in the holes. The at least one processing device is further configured, in response to locating the region, to at least partially fill the holes in the virtual view image and the virtual depth map with image data and depth data associated with the located region to generate a filled virtual view image and a filled virtual depth map. In addition, the at least one processing device is configured to generate a virtual view to present on the display panel using the filled virtual view image and the filled virtual depth map.

In a third embodiment, a non-transitory machine-readable medium contains instructions that when executed cause at least one processor of an electronic device to generate a virtual view image and a virtual depth map based on an image captured using a see-through camera and a depth map corresponding to the image. The virtual view image and the virtual depth map include holes for which image data or depth data cannot be determined based on the image and the corresponding depth map. The medium also contains instructions that when executed cause the at least one processor to search one or more previous images captured using the see-through camera or one or more other see-through cameras to locate a region in at least one of the one or more previous images that includes missing pixels in the holes. The medium further contains instructions that when executed cause the at least one processor, in response to locating the region, to at least partially fill the holes in the virtual view image and the virtual depth map with image data and depth data associated with the located region to generate a filled virtual view image and a filled virtual depth map. In addition, the medium contains instructions that when executed cause the at least one processor to generate a virtual view to present on a display panel of a VST AR device using the filled virtual view image and the filled virtual depth map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B. and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member." "apparatus." "machine," "system," "processor," or "controller." within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
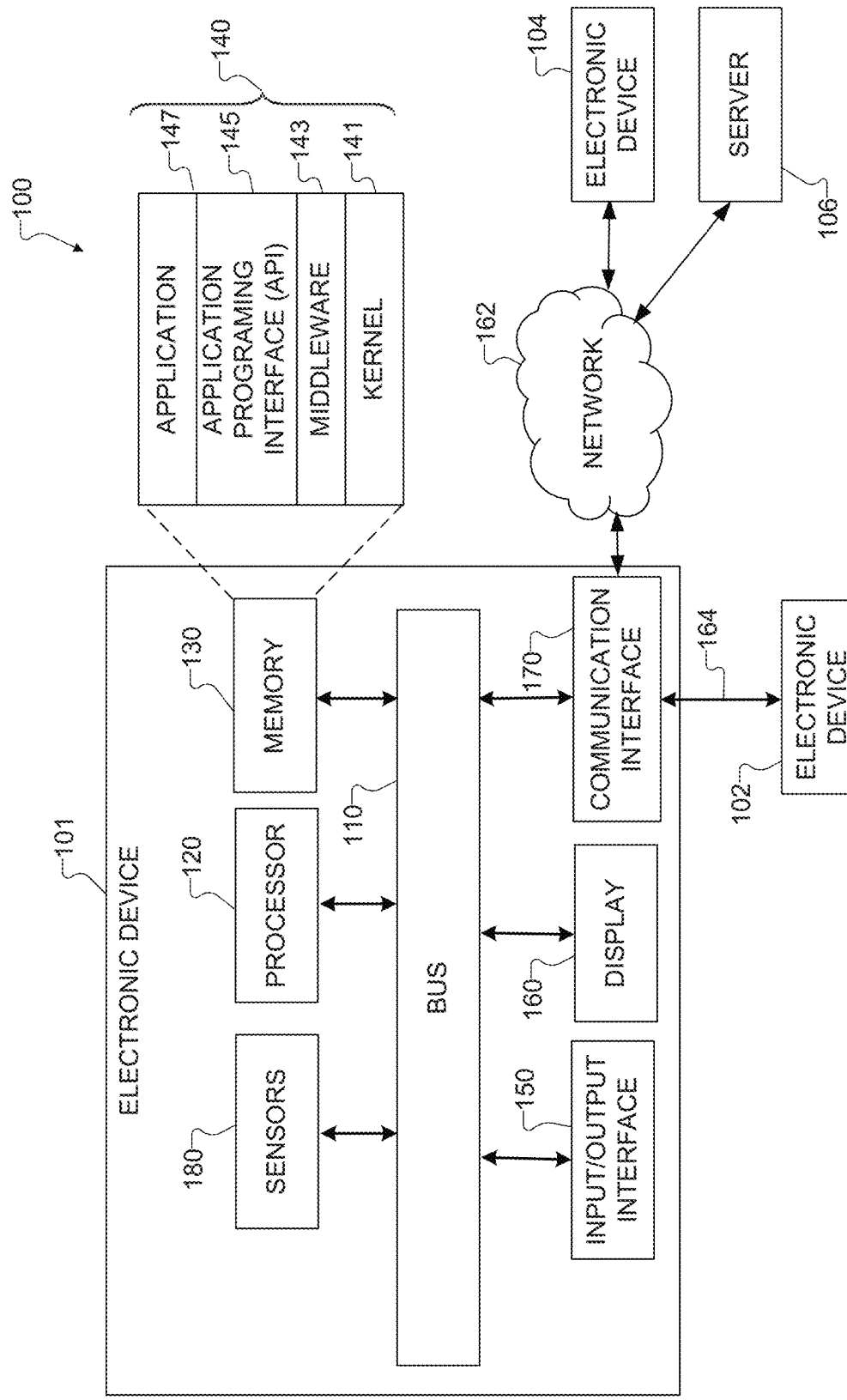
FIG. 1 illustrates an example network configuration including an electronic device according to this disclosure.

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

In various implementations, see-through cameras are typically high-resolution cameras (such as 2K or 4K cameras or higher). In order to provide quality user experiences with AR headsets, the latency of video frame transformations may need to be as low as possible in order to reduce or prevent users from noticing delays when moving their heads. However, existing techniques generally cannot process high-resolution images from see-through cameras to generate virtual view frames with adequately low latencies.

Unlike optical see-through AR in which a user can see a surrounding scene directly, video see-through (VST) AR recreates the surrounding scene using see-through cameras installed on an AR headset. Because the positions of the see-through cameras are different from the positions of the user's eyes, virtual images at the viewpoints of the user's eyes are generated from the image frames captured at the viewpoints of the see-through cameras. In this manner, the user's eyes can see the outside scene through the cameras as if the see-through cameras were installed at the viewpoints of eyes.

VST AR has some advantages over other types of AR, including a wider field of view, usability in outdoor environments, dark color occlusion, and altering perception. However, VST AR systems also face certain challenges. For example, in VST AR, left and right virtual views are created from the see-through cameras, and the virtual view quality depends on depth-based virtual view synthesis and rendering. Since the virtual cameras and the see-through cameras are not in the same locations (and thus have different poses), synthesized virtual views can have various artifacts, such as sampling gaps, disoccluded regions (holes), and contour artifacts due to mixing of foreground and background colors.

This disclosure provides various techniques for disoccluded region completion for video rendering in VST AR. As described in more detail below, the disclosed systems and methods provide new and efficient algorithms and techniques to remove hole artifacts in order to create high-quality virtual views for VST AR. To remove hole artifacts, various disclosed embodiments use one or more operations, such as finding a best match in existing information, depth-guided color populating, and feature- and structure-guided hole filling. Disclosed embodiments also provide techniques for completing disoccluded regions of a virtual depth map, such as by generating depth values while keeping original depths and considering neighborhood depth properties. Disclosed embodiments further provide techniques for completing disoccluded regions of a virtual view image, such as by depth-guided generation of color values while keeping original image values and considering neighborhood image properties. In addition, disclosed embodiments provide techniques for completing small-size disoccluded regions in a virtual depth map and a virtual view image.

These techniques use depth features or image features and structure-guided depth generation or structure-guided color generation in order to keep original features and structures of a depth map or image. In some cases, the disclosed embodiments can be conveniently implemented with graphics processor unit (GPU) computing for high performance.

Note that while some of the embodiments discussed below are described in the context of use in consumer electronic devices (such as AR headsets), this is merely one example, and it will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for disoccluded region completion for video rendering in one or more VST AR applications.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for disoccluded region completion for video rendering in one or more VST AR applications as discussed below. These functions can be performed by a single application or by multiple applications that each carry out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)). Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, w % ben the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for disoccluded region completion for video rendering in one or more VST AR applications.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
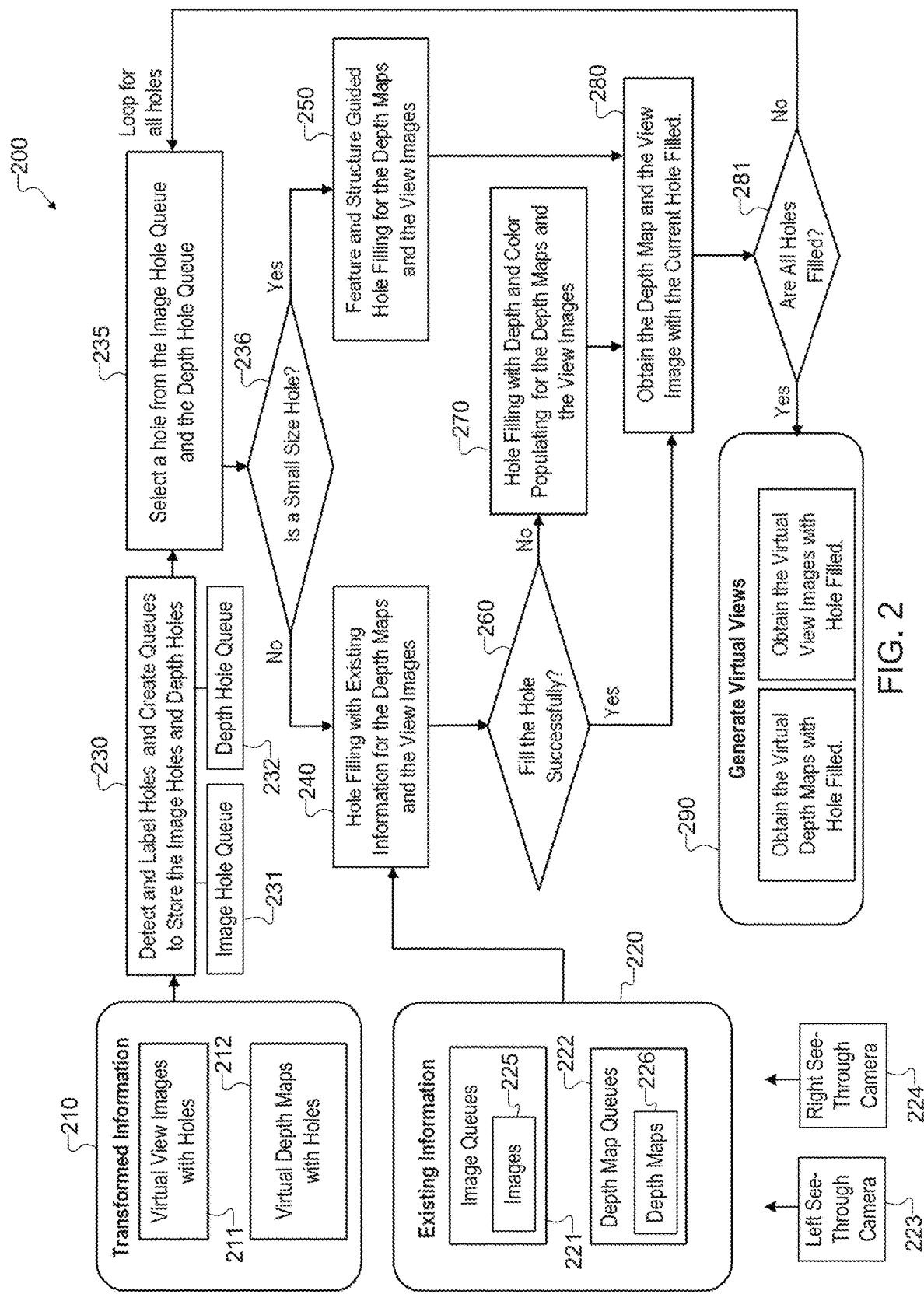
FIG. 2 illustrates an example process for disoccluded region completion for video rendering in video see-through (VST) augmented reality (AR) according to this disclosure.

FIG. 2 illustrates an example process 200 for disoccluded region completion for video rendering in VST AR according to this disclosure. For ease of explanation, the process 200 is described as being performed using one or more components of the network configuration 100 of FIG. 1 described above, such as the electronic device 101. However, this is merely one example, and the process 200 could be performed using any other suitable device(s) and in any other suitable system(s).

As shown in FIG. 2, the electronic device 101 obtains transformed information 210 of virtual view images and one or more depth maps, as well as existing information 220 captured by at least one of multiple see-through cameras 223 and 224 or other sensors. The transformed information 210 includes constructed virtual view images 211 with one or more holes and constructed virtual depth maps 212 with one or more holes. The virtual view images 211 and the virtual depth maps 212 are generated by depth re-projection from one or more see-through cameras 223 and 224 to one or more virtual cameras, where the one or more see-through camera viewpoints are not the same as the one or more virtual camera viewpoints. Here, the see-through cameras 223 and 224 may represent imaging sensors 180 of the electronic device 101, and the virtual camera viewpoints may correspond to the eye viewpoints of a user. For example, the electronic device 101 may include one or more sensors 180 that implement high-resolution see-through cameras 223 and 224. In some embodiments, the first and second see-through cameras 223 and 224 can be arranged as left and right see-through cameras. Also, in some embodiments, parallax correction may have been performed on the virtual view images 211, where any suitable technique can be used for parallax correction.

Figure 3B:
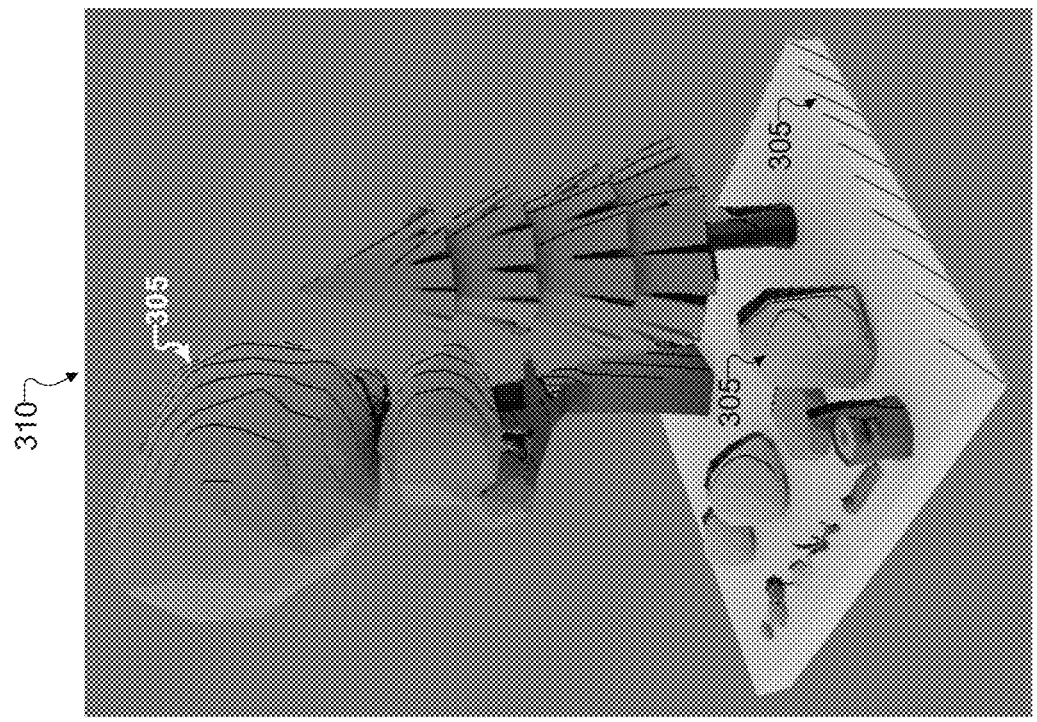
FIGS. 3A and 3B illustrate examples of virtual view images with hole artifacts according to this disclosure.
Figure 3A:
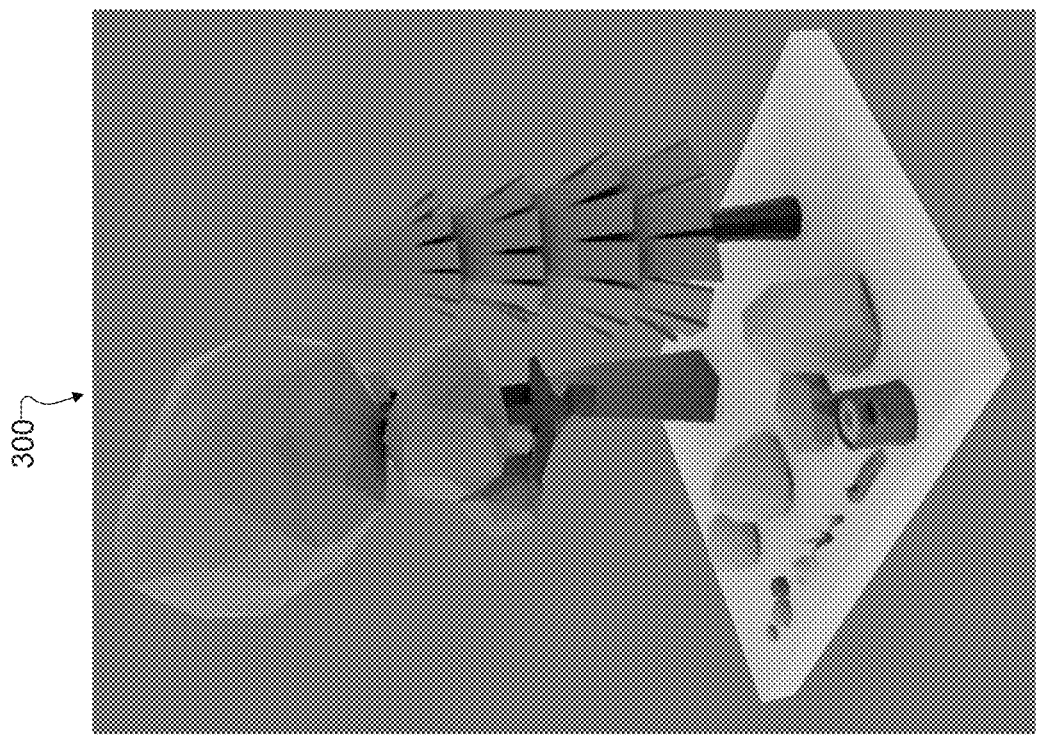

FIGS. 3A and 3B illustrate examples of virtual view images with hole artifacts according to this disclosure. In particular, FIG. 3A shows an image 300 of a landscape, where the image 300 represents an original image that is captured with one or more see-through cameras. FIG. 3B shows a virtual view image 310, which is generated based on the image 300 after a transformation. As shown in FIG. 3B, the virtual view image 310 includes hole artifacts 305 (such as disoccluded regions) that may be generated in the virtual view image 310. The virtual view image 310 can represent (or be represented by) one of the constructed virtual view images 211 in FIG. 2.

Returning to FIG. 2, the existing information 220 includes one or more image queues 221 containing one or more images 225 from one or more of the see-through cameras 223 and 224, as well as one or more depth map queues 222 containing one or more depth maps 226 from the see-through cameras 223 and 224. The see-through cameras 223 and 224 can capture images 225 having any suitable resolution and dimensions depending on the capabilities of the see-through cameras 223 and 224. In some embodiments, for instance, the images 225 includes RGB image data, which typically includes image data in three color channels (namely red, green, and blue color channels). However, the images 225 may include image data having any other suitable form or arrangement.

In some cases, the electronic device 101 creates a separate image queue 221 for each see-through camera 223 and 224 to store an image sequence with a specified number of see-through images 225 captured by the associated see-through camera 223 and 224. The images 225 in each image queue 221 can be updated by replacing the oldest image 225 with the latest captured image 225 while a user uses the electronic device 101. Similarly, in some cases, the electronic device 101 creates a separate depth map queue 222 for each see-through camera 223 and 224 to store a depth map sequence with a specified number of see-through depth maps 226 for the associated see-through camera 223 and 224. The depth maps 226 in each depth map queue 222 can be updated by replacing the oldest depth map 226 with the latest depth map 226 while the user uses the electronic device 101.

At operation 230, the electronic device 101 detects one or more holes in the current virtual view image 211 and the current virtual depth map 212 and labels each hole. For example, the electronic device 101 may create an image hole queue 231 to store information regarding any image holes in the virtual view image 211 and create a depth hole queue 232 to store information regarding any depth holes in the virtual depth map 212. Various parameters of each hole may be determined and stored in the corresponding queue 231 and 232, such as the size, position, orientation, and contour of each hole. Any other or additional hole parameter can be obtained and stored here. Note that holes in a virtual depth map 212 may not be the same as holes in a corresponding virtual view image 211 because the depth information in the virtual depth map 212 may be captured with one or more different sensors 180 (such as one or more depth sensors) at one or more different viewpoints compared to the see-through cameras 223 and 224.

At operation 235, the electronic device 101 selects an image hole from the image hole queue 231 and selects a corresponding depth hole from the depth hole queue 232. The electronic device 101 performs operation 236 to check the size of the selected hole and determine if the selected hole is a small hole, such as by determining if the hole has a small size. Here, a hole can be characterized as small or not small based on at least one dimension of the hole. For example, in some embodiments, the width of the hole in pixels is used to determine whether or not the hole is small. As a particular example, a hole may be considered a small hole if the width of the hole is one pixel or two pixels. Of course, these are merely examples, and other threshold values can be used here. Also, other considerations of the hole (such as hole height) could be additionally or alternatively used to determine whether or not the hole is a small hole.

If it is determined in operation 236 that the selected hole has a small hole size, the electronic device 101 performs a hole filling operation 250, which can include the use of a feature- and structure-guided hole filling algorithm to fill the selected hole(s) for the virtual view images 211 and the virtual depth maps 212 in the left and right virtual camera views. This is described in greater detail below in conjunction with FIG. 8. Conversely, if it is determined in operation 236 that the hole does not have a small hole size, the electronic device 101 performs a hole filling operation 240.

As described in greater detail below, the hole filing operation 240 may include the use of an algorithm for hole filling with existing real information of one or more images 225 and one or more depth maps 226 captured by the see-through camera(s) 223 and 224. In the hole filling operation 240, the electronic device 101 defines a region that includes a current hole and one or more neighborhood areas in the virtual view image 211 and the virtual depth map 212, and the electronic device 101 searches for a most similar region in the image queues 221 and the depth map queues 222.

Figure 4:
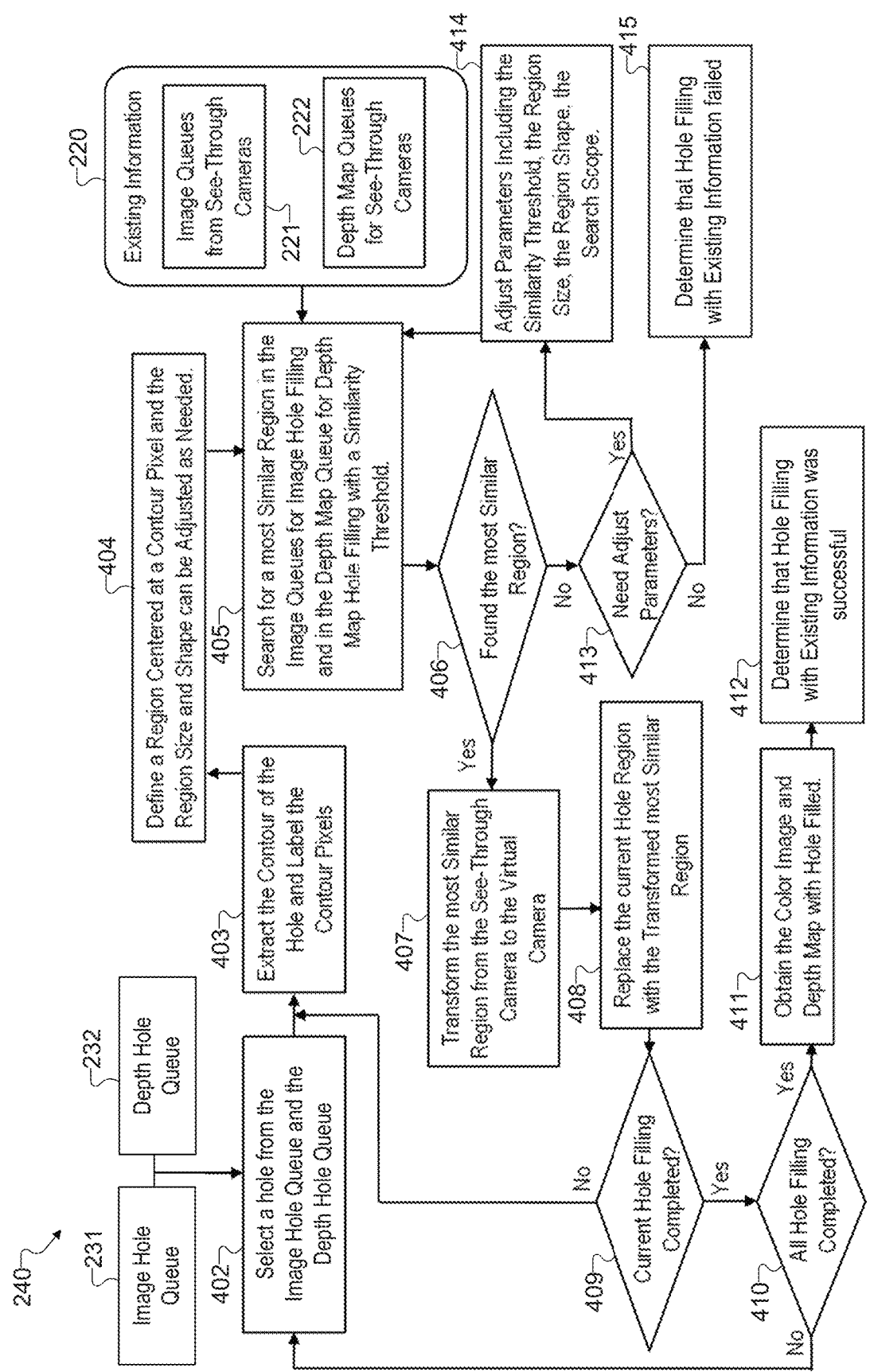
FIG. 4 illustrates example details of a hole filling operation in the process of FIG. 2 according to this disclosure.

FIG. 4 illustrates example details of the hole filling operation 240 in the process 200 of FIG. 2 according to this disclosure. As shown in FIG. 4, at operation 402, the electronic device 101 obtains a hole to be filled from the image hole queue 231 (containing any holes in the virtual view images 211) and the depth hole queue 232 (containing any holes in the virtual depth maps 212). At operation 403, the electronic device 101 detects and extracts a contour of the hole and labels pixels of the contour. Any suitable technique or algorithm can be used for contour detection and pixel labeling. At operation 404, the electronic device 101 defines a region centered at a contour pixel. For example, the electronic device 101 can use a rectangular shape or a circular shape for the region, where the region includes pixels of the virtual view image 211 and pixels of the hole. In some cases, the electronic device 101 can adjust the size and shape of the region as needed or desired. At operation 405, the electronic device 101 performs a search to identify a most similar region in the existing information 220 contained in the image queues 221 for image hole filling and in the depth map queues 222 for depth map hole filling. In some cases, this can involve the use of a specified similarity threshold.

Figure 5:
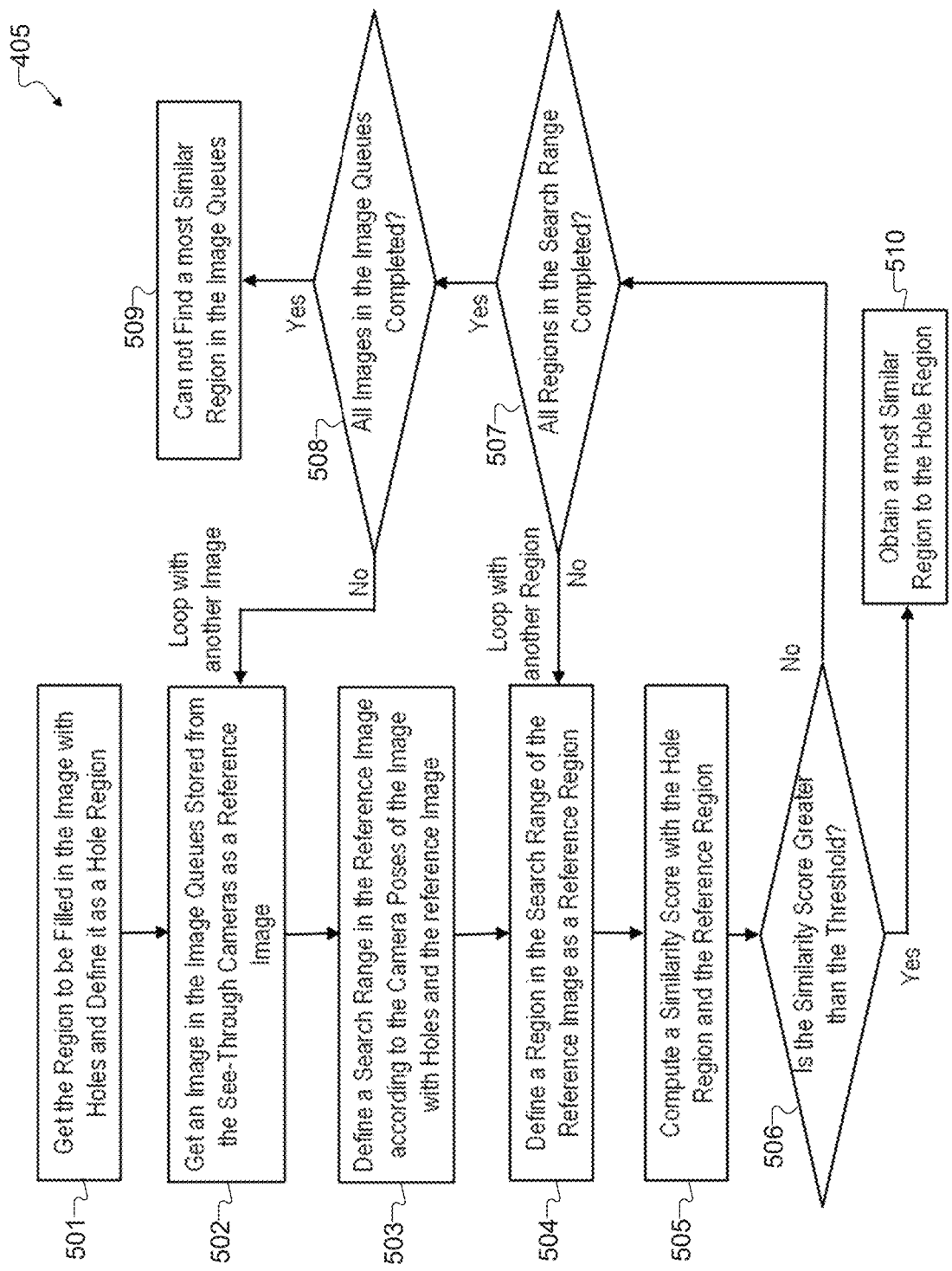
FIGS. 5 and 6 illustrate example details of a search operation in the hole filling operation according to this disclosure.
Figure 6:
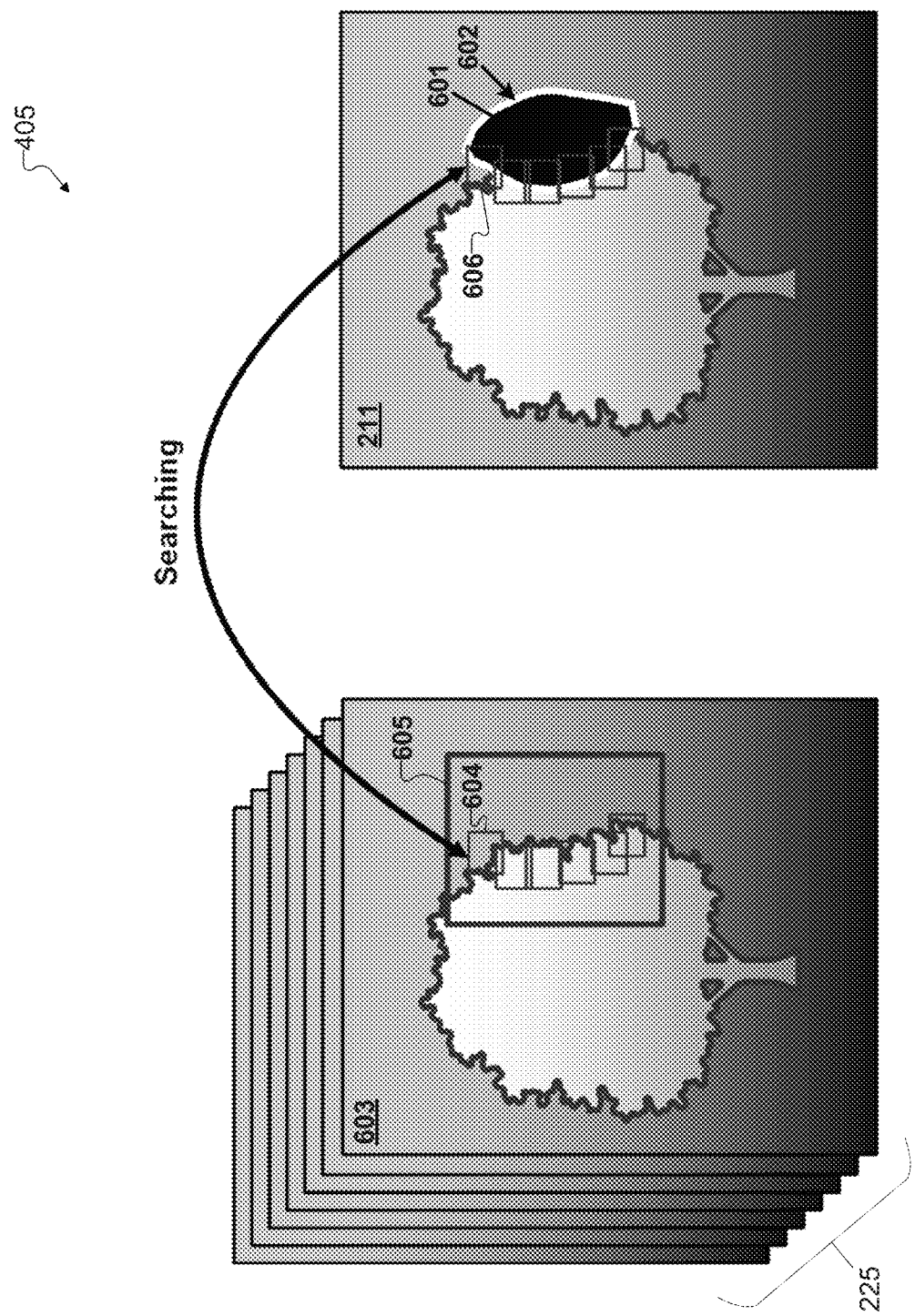

FIGS. 5 and 6 illustrate example details of the search operation 405 in the hole filling operation 240 according to this disclosure. As shown in FIG. 5, at operation 501, the electronic device 101 obtains a region containing one or more holes to be filled in the virtual view image 211 and defines the region as a hole region. This is illustrated in the example shown in FIG. 6, where the virtual view image 211 includes a hole 601. The hole 601 includes a contour 602 surrounding the hole 601. The electronic device 101 defines a first hole region 606 centered at a pixel on the contour 602 of the hole 601.

At operation 502, the electronic device 101 selects an image 225 from the images 225 in the image queues 221 and defines the selected image 225 as a reference image 603. At operation 503, the electronic device 101 defines a search range 605 in the reference image 603, such as according to the camera poses of the virtual view image 211 and the reference image 603. At operation 504, the electronic device 101 defines and extracts a reference region 604 in the search range 605 of the reference image 603. At operation 505, the electronic device 101 computes a similarity score that indicates a similarity between the hole region 606 and the reference region 604. In some embodiments, the similarity score is a scalar value. The electronic device 101 can use any suitable technique or algorithm for computing the similarity score. At operation 506, the electronic device 101 determines if the similarity score is greater than a threshold value. If the similarity score is greater than the threshold value, the electronic device 101 determines that the most similar region to the hole region 606 has been obtained at operation 510, and the electronic device 101 can finish the search process. Conversely, if the electronic device 101 determines that the similarity score is not greater than the threshold value at operation 506, the process moves to operation 507.

At operation 507, the electronic device 101 determines whether all reference regions 604 in the search range 605 have been checked. If the electronic device 101 determines that there are still some reference regions 604 in the search range 605 that have not been checked, the electronic device 101 selects a different reference region 604 and hole region 606 and repeats the operations 504 to 506. If the electronic device 101 determines that all reference regions 604 in the search range 605 have been checked at operation 507, the process moves to operation 508. At operation 508, the electronic device 101 determines if all images 225 in the image queues 221 have been checked. If the electronic device 101 determines that there are still some images 225 in the image queues 221 that have not been checked, the electronic device 101 selects a different image 225 and repeats the process including operations 502-506. If the electronic device 101 determines that all images 225 in the image queues 221 have been checked at operation 508, the electronic device 101 concludes that the electronic device 101 cannot find a most similar region in any image 225 in the image queues 221 at operation 509 and finishes the search process.

Returning to FIG. 4, at operation 406, the electronic device 101 determines if the most similar region has been found based on the search operation 405 (as described above in conjunction with FIG. 5). If the search operation 405 ends at operation 509, the electronic device 101 cannot find a most similar region in any image 225 in the image queues 221 and concludes that the most similar region has not been found in operation 406. In that case, the process moves to operation 413. If the search operation 405 ends at operation 510, the electronic device 101 determines that the most similar region to the hole region 606 has been obtained and concludes that the most similar region has been found in operation 406. In that case, the process moves to operation 407.

At operation 407, the electronic device 101 transforms the most similar region from the see-through camera perspective to the virtual camera perspective. This transformation can involve the use of any suitable transformation algorithm or technique, such as pixel-wise translation or transformation, overlapping compensation, or other algorithms or techniques. At operation 408, the electronic device 101 replaces the current hole region 606 with the transformed most similar region to fill the hole 601. At operation 409, the electronic device 101 determines whether or not the filling of the current hole 601 is completed. If the filling of the current hole 601 is not completed, the process returns to operation 403 to repeat the hole filling process and continue filling the current hole 601. If the filling of the current hole 601 is completed, the process moves to operation 410. At operation 410, the electronic device 101 determines whether or not all holes 601 are filled. If all holes 601 are filled, the process moves to operation 411. If not all holes 601 are filled, the electronic device 101 returns to operation 402 to identify a new hole 601 from the image hole queues 231 and the depth hole queues 232 and repeat the hole filling process. At operation 411, the electronic device 101 stores the current virtual view image 211 and the virtual depth map 212 with the filled hole 601. At operation 412, the electronic device 101 determines that hole filling with existing information was successful.

At operation 413, the electronic device 101 determines whether or not one or more search parameters used in the search operation 405 (such as the similarity threshold, the region size, the region shape, the search scope, or the like) need to be adjusted. Adjusting one or more search parameters may yield better results in the search operation 405. If the electronic device 101 determines that one or more search parameters need to be adjusted, the electronic device 101 adjusts the parameters in operation 414 and repeats the search operation 405 with the adjusted parameters. If the electronic device 101 determines that no search parameters need to be adjusted, the electronic device 101 determines that that hole filling with existing information has failed in operation 415. In such a case, the electronic device 101 can use another approach to fill the hole 601 as described below.

Returning to FIG. 2, at operation 260, the electronic device 101 checks the result of operation 240 to determine if the hole 601 is successfully filled. If the hole filling with existing information is successful, the electronic device 101 obtains the virtual view image 211 and the virtual depth map 212 with the current hole 601 filled at operation 280. If the hole filling with existing information is not successful, the electronic device 101 moves to operation 270 to fill the hole 601 using a depth and color populating process.

Figure 7:
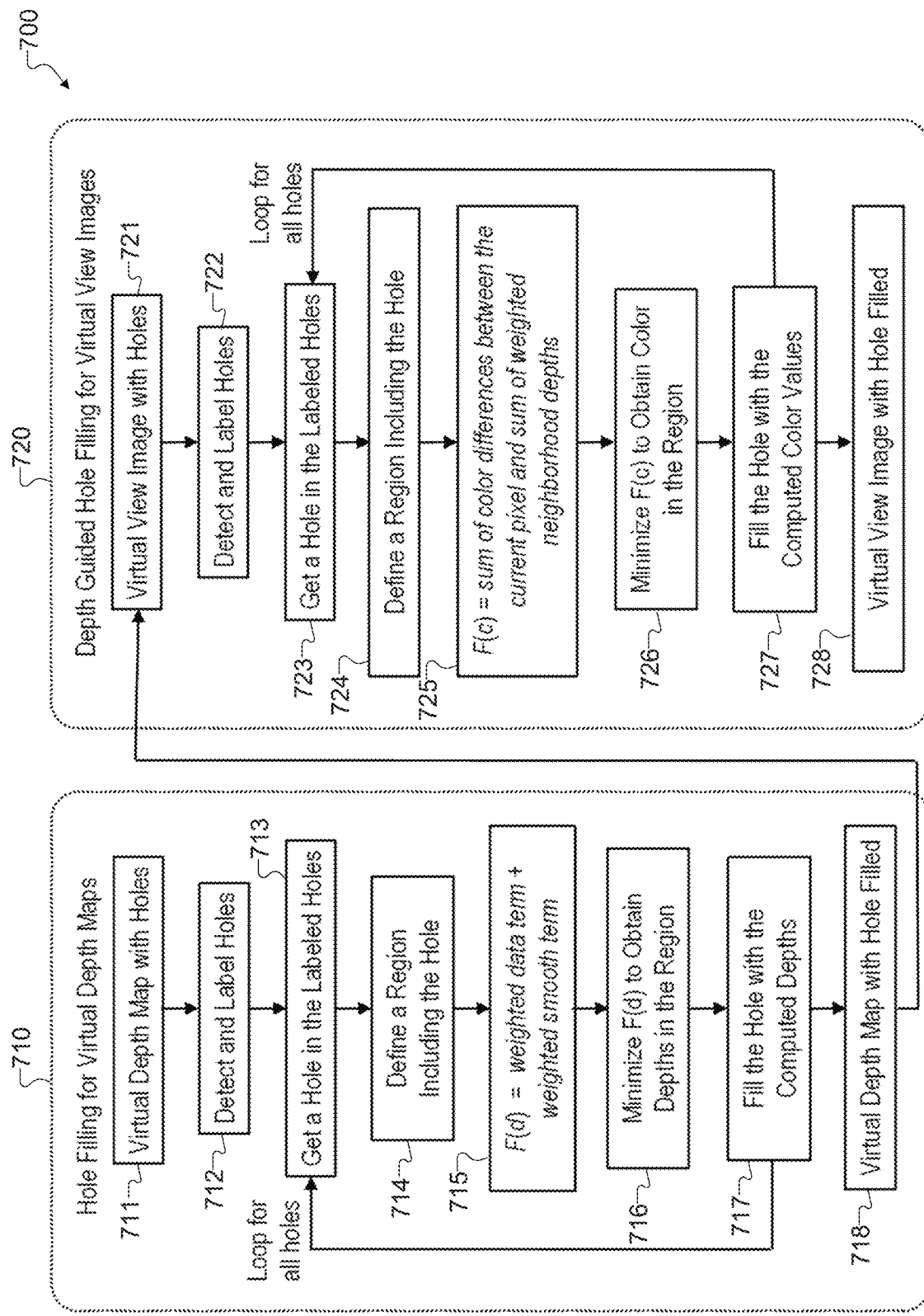
FIG. 7 illustrates an example depth and color populating process for use in the process of FIG. 2 according to this disclosure.

FIG. 7 illustrates an example depth and color populating process 700 for use in the process 200 of FIG. 2 according to this disclosure. As shown in FIG. 7, the depth and color populating process 700 includes a hole filling process 710 for virtual depth maps 212 and a depth-guided hole filling process 720 for virtual view images 211. As described below, the electronic device 101 may perform the hole filling process 710 and then perform the depth-guided hole filling process 720. However, this is for illustration only and can vary as needed or desired.

In the hole filling process 710, at operation 711, the electronic device 101 obtains the virtual depth map 212. At operation 712, the electronic device 101 detects and labels the holes 601 in the virtual depth map 212. If the holes 601 were already labeled in operation 230, the electronic device 101 use these labels without detecting and labeling the holes 601 again. The electronic device 101 selects one of the labeled holes 601 at operation 713, and the electronic device 101 defines a map region including the hole 601 at operation 714. The map region can be defined to include some parts of the virtual depth map 212 that are not holes 601. That is, some parts of the map region include known pixels with known depth data and known image data.

At operation 715, the electronic device 101 defines a criterion function F(d) for propagating existing depths in the region to the pixels in the hole 601. In some embodiments, this may occur as follows. Assume d is a depth at a pixel p in the defined region. The electronic device 101 may define the criterion function F(d) using a weighted data term and a weighted smooth term. For example, in particular embodiments, the criterion function F(d) may be defined according to the following equation.

$$F(d) = \lambda_e \Sigma_{p \in R} |d(p) - d_e(p)| + \Sigma_{(p,q) \in N} \lambda_{pq} |d(p) - d(q)| \qquad (1)$$

Here, R is the region with the hole, $\lambda_e$ is the weight for the data term, $\lambda_{pq}$ is the weight for the smooth term, d(p) is the depth at the pixel p, and q is a pixel in the neighborhood (p,q)∈N. At operation 716, the electronic device 101 minimizes the criterion function F(d) to obtain depths in the defined region. In some embodiments, the electronic device 101 can obtain the depths at pixels in the hole 601 using the following approach.

$$\underset{D}{\operatorname{argmin}} F(d) \qquad (2)$$

At operation 717, the electronic device 101 uses the generated depths to fill the hole 601. The electronic device 101 can repeat operations 713-717 until all holes 601 are filled in the virtual depth map 212. At operation 718, the electronic device 101 stores the virtual depth map 212 with holes 601 filled.

In the depth-guided hole filling process 720, at operation 721, the electronic device 101 obtains the virtual view image 211 with holes 601 and the corresponding virtual depth map 212 with filled holes 601 (as generated in the hole filling process 710). At operation 722, the electronic device 101 detects and labels holes 601 in the virtual view image 211. If the holes 601 were already labeled in operation 230, the electronic device 101 uses these labels without detecting and labeling the holes 601 again. The electronic device 101 selects one of the labeled holes 601 at operation 723, and the electronic device 101 defines a region including the hole 601 at operation 724. The region can be defined to include some parts of the virtual view image 211 that are not holes 601. These non-hole pixels can be used for populating the color to the pixels in the hole 601.

At operation 725, the electronic device 101 defines a criterion function F(c) with neighborhood color information and depth information to populate the colors of pixels in the region to the pixels in the hole 601. In some embodiments, this may involve the use of the following equation.

$$F(c) = \Sigma_{p \in R}(c(p) - \Sigma_{q \in N(p)} \lambda_{pq}(d(p), d(q), p, q)c(q))^2 \quad (3)$$

Here, p is a considered pixel, R is the defined region, c(p) is a color at the pixel p, c(q) is a color at the pixel q, $\lambda_{pq}$ is a weight for considering depths at the pixel p and the pixel q, d(p) is the depth at the pixel p, and d(q) is the depth at the pixel q. At operation 726, the electronic device 101 minimizes the criterion function F(c) to obtain color in the defined region. In some embodiments, the electronic device 101 can obtain color values at pixels in the hole 601 using the following approach.

$$\underset{c}{\arg\min} F(c) \quad (4)$$

At operation 727, the electronic device 101 fills the hole 601 with the populated color values. The electronic device 101 can repeat operations 723-727 until all holes 601 are filled in the virtual view image 211. At operation 728, the electronic device 101 stores the virtual view image 211 with holes 601 filled.

Figure 8:
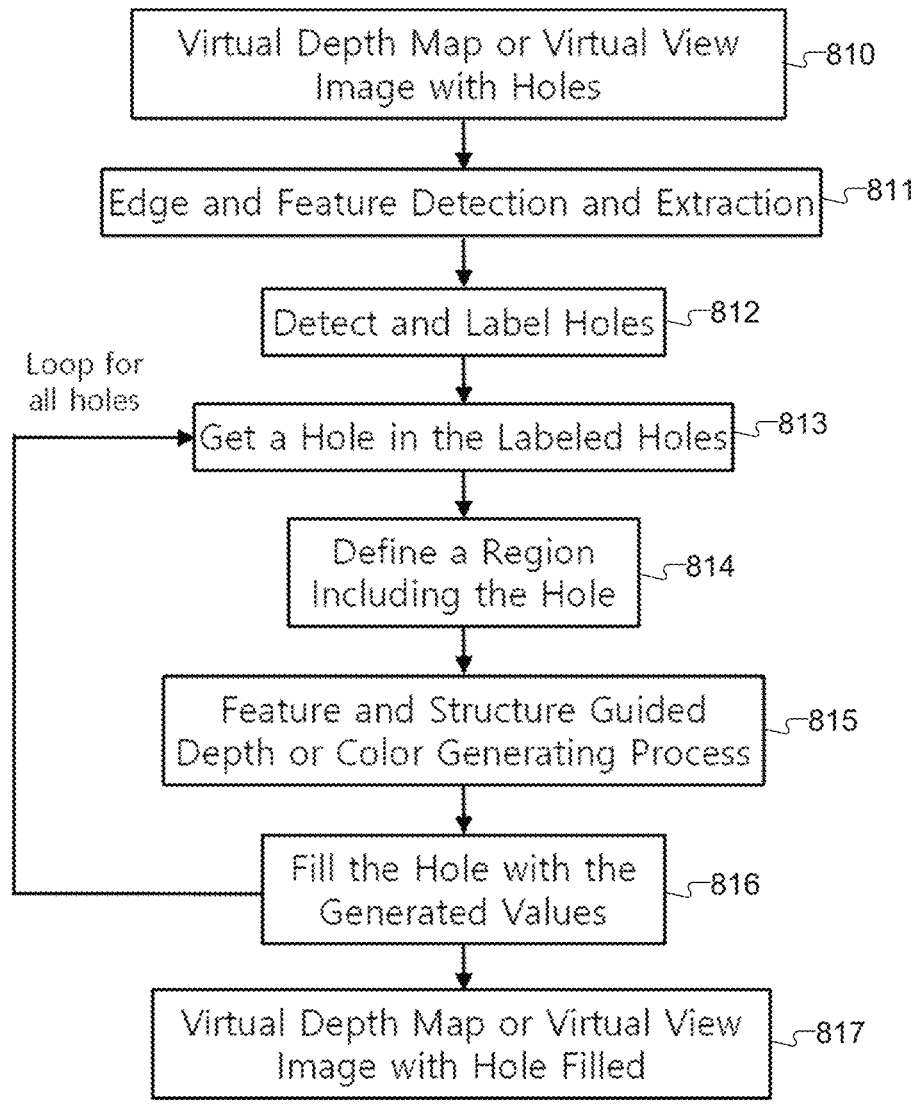
FIG. 8 illustrates an example feature- and structure-guided hole filling process for use in the process of FIG. 2 according to this disclosure.

Returning again to FIG. 2, as discussed above, if it is determined in operation 236 that the hole 601 has a small hole size, the electronic device 101 performs the hole filling operation 250, which can include a feature- and structure-guided hole filling process to fill the hole 601. FIG. 8 illustrates an example feature- and structure-guided hole filling process 800 for use in the process 200 of FIG. 2 according to this disclosure. The process 800 can be used for both the virtual view images 211 and the virtual depth maps 212.

At operation 810, the electronic device 101 obtains the virtual view image 211 or the virtual depth map 212 with the hole(s) 601. At operation 811, the electronic device 101 performs feature detection and extraction on one or more edge or contour features of the virtual view image 211 or the virtual depth map 212, which can be used for guiding the hole filling process. At operation 812, the electronic device 101 detects and labels the hole(s) 601 in the virtual view image 211 or the virtual depth map 212. If the holes 601 are already labeled in previous steps, the electronic device 101 can just use these labels. The electronic device 101 selects one of the labeled holes 601 at operation 813, and the electronic device 101 defines a first region including the hole 601 in the virtual view image 211 or the virtual depth map 212 and a second region for a corresponding feature image derived from the extracted edge or contour features at operation 814. In this way, the electronic device 101 obtains two corresponding regions, where one is a depth map region or an image region and the other is a feature image region. At operation 815, the electronic device 101 performs a feature- and structure-guided depth or color generating process to generate depths or colors for the hole 601 of the virtual depth map 212 or the hole 601 of the virtual view image 211. In this way, the virtual depth map 212 or the virtual view image 211 can keep the original features and structures in the filled hole areas.

Figure 9C:
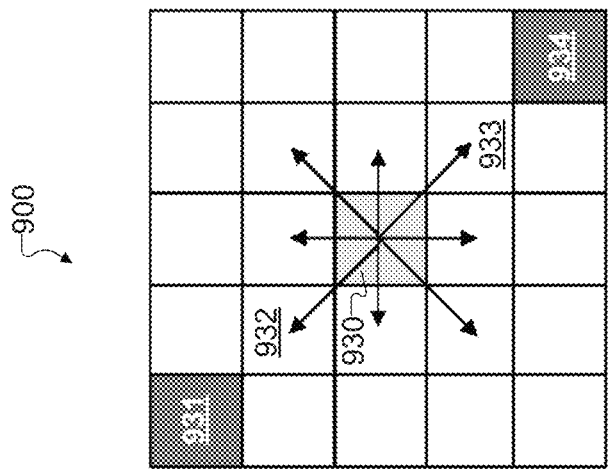
FIGS. 9A through 9C illustrate example details of a feature- and structure-guided depth or color generating process for use in the feature- and structure-guided hole filling operation of FIG. 8 according to this disclosure.
Figure 9B:
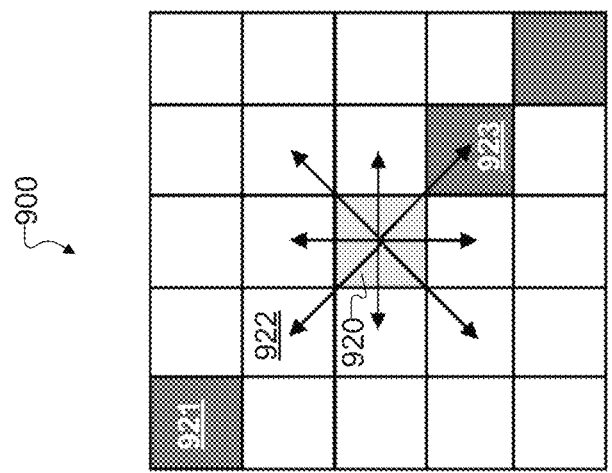
Figure 9A:
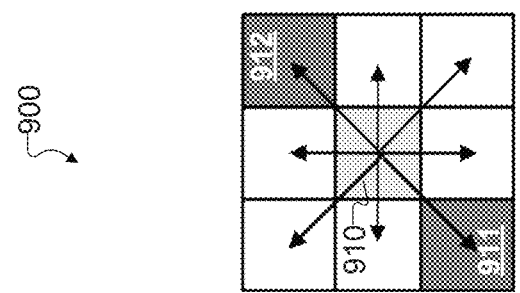

FIGS. 9A through 9C illustrate example details of a feature- and structure-guided depth or color generating process 900 for use in the feature- and structure-guided hole filling operation 815 of FIG. 8 according to this disclosure. In particular, FIG. 9A shows an example case in which the width of a small hole 601 is one pixel, FIG. 9B shows an example case in which the width of a small hole 601 is two pixels, and FIG. 9C shows an example case in which the width of a small hole 601 is three pixels. In each case, the electronic device 101 can use the clues of features (such as image edges and contours) to generate new values to fill the holes 601.

As shown in FIG. 9A, the width of the small hole 601 is one pixel. A pixel 910 represents a current missing pixel in the small hole 601. The electronic device 101 considers a new value for the current pixel 910 based on other pixels located in two or more directions from the current pixel 910. The two or more directions are taken from the eight compass directions, meaning north (up), northeast (up and right), east (right), southeast (down and right), south (down), southwest (down and left), west (left), and northwest (up and left), as indicated by the arrows in FIG. 9A. If two pixels (pixels 911 and 912) in two opposite directions from the current pixel 910 are feature points, the electronic device 101 can connect the features at the current pixel 910 and create a new value V($p_{910}$) for the current pixel 910 with the average of the two pixels 911 and 912. In some cases, this may be done using the following equation.

$$V(p_{910}) = \frac{1}{2}(V(p_{911}) + V(p_{912})) \quad (5)$$

Here, V($p_{911}$) is the value at the pixel 911, and V($p_{912}$) is the value at the pixel 912. Note that while the pixels 911 and 912 are shown in the southwest and northeast directions, respectively, this is merely one example. Pairs of pixels in other directions (such as north and south, east and west, northwest and southeast, etc.) could be used. If there is not any feature point in any of the eight directions, the electronic device 101 can set a value for the current pixel 910 using a value of any of its neighboring pixels. In some cases, this may be done as follows.

$$V(p_{910}) = \text{value of any neighboring pixels} \quad (6)$$

If only one of the pixels in two opposite directions from the current pixel 910 is a feature point, the electronic device 101 can set a value for the current pixel 910 using the value of either the feature point pixel or the non-feature point pixel. In some cases, this may be done as follows.

$$V(p_{910}) = \text{value of the feature point or nonfeature point} \quad (7)$$

As shown in FIG. 9B, the width of the small hole 601 is two pixels. Two pixels 920 and 922 represent current missing pixels in the small hole 601. The electronic device 101 considers new values for the current pixels 920 and 922 based on other pixels located in two or more directions from the current pixels 920 and 922. For example, if two pixels (pixels 921 and 923) in two opposite directions from the current pixels 920 and 922 are feature points, the electronic device 101 can create new values for the current pixels 920 and 922. In some cases, this may be done using the following equations.

$$V(p_{922}) = \frac{1}{2}(V(p_{921}) + V(p_{923})) \quad (8)$$

$$V(p_{920}) = \frac{1}{2}(V(p_{922}) + V(p_{923})) \quad (9)$$

If there is not any feature point in the eight directions or if only one of the pixels in the two opposite directions from the current pixels 920 and 922 is a feature point, the electronic device 101 may use Equation (6) or Equation (7) to set the values for the current pixels 920 and 922.

As shown in FIG. 9C, the width of the small hole 601 is three pixels. Three pixels 920, 932, and 933 represent current missing pixels in the small hole 601. The electronic device 101 considers new values for the current pixels 920, 932, and 933 based on other pixels located in two or more directions from the current pixels 920, 932, and 933. For example, if two pixels (pixels 931 and 934) in two opposite directions from the current pixels 920, 932, and 933 are feature points, the electronic device 101 can create new values for the current pixels 920, 932, and 933. In some cases, this may be done using the following equations.

$$V(p_{932}) = \frac{1}{2}(V(p_{931}) + V(p_{934})) \quad (10)$$

$$V(p_{933}) = \frac{1}{2}(V(p_{932}) + V(p_{934})) \quad (11)$$

$$V(p_{930}) = \frac{1}{2}(V(p_{932}) + V(p_{933})) \quad (12)$$

If there is not any feature point in the eight directions or if only one of the pixels in the two opposite directions from the current pixels 920, 932, and 933 is a feature point, the electronic device 101 can use Equation (6) or Equation (7) to set the values for the current pixels 920, 932, and 933.

Returning to FIG. 8, once the electronic device 101 has completed the feature- and structure-guided depth or color generating process 900, the electronic device 101 fills the current hole 601 with the generated depths or color values in operation 816. The electronic device 101 repeats operations 813-816 until all small holes 601 are filled. At operation 817, the electronic device 101 stores the virtual view image 211 or the virtual depth map 212 with small holes filled.

Returning again to FIG. 2, after filling the selected hole 601 with one or more of the hole filling operations 240, 250, and 270, the electronic device 101 obtains the virtual depth map 212 and the virtual view image 211 with the selected hole 601 filled. At operation 281, the electronic device 101 determines if all holes 601 have been filled in the virtual view image 211 and the virtual depth map 212 for the left and right virtual cameras. If the electronic device 101 determines that not all of the holes 601 are filled, the process 200 returns to operation 235, and the electronic device 101 repeats operations 235-280 until all holes 601 are filled in the virtual view image 211 and the virtual depth map 212. If the electronic device 101 determines that all of the holes 601 are filled, the electronic device 101 obtains the filled virtual view image 211 and the filled virtual depth map 212 at operation 290 and generates a virtual view using the filled virtual view image 211 and the filled virtual depth map 212. In some embodiments, the electronic device 101 generates left and right virtual views.

Although FIGS. 2 through 9C illustrate examples of a process 200 for disoccluded region completion for video rendering in video see-through augmented reality and related details, various changes may be made to FIGS. 2 through 9C. For example, while described as involving specific sequences of operations, various operations of the techniques described with respect to FIGS. 2 through 9C could overlap, occur in parallel, occur in a different order, or occur any number of times (including zero times). Also, the specific operations shown in FIGS. 2 through 9C are examples only, and other techniques could be used to perform each of the operations shown in FIGS. 2 through 9C.

As an example of another technique, after the electronic device 101 defines a region for filling a hole 601 as described above, the electronic device 101 searches for the best match depth region from the depth map queues 222 for virtual depth map hole filling and searches for the best match image region from the image queues 221. The depth map queues 222 and the image queues 221 are created using the see-through cameras 223 and 224. In one or more alternative embodiments, the electronic device 101 can create the depth map queues 222 with the hole-filled virtual depth maps 212 and fill the image queues 221 with the hole-filled virtual view images 211. At the initial steps, the electronic device 101 can use hole filling with pixel expansion, depth propagation, color propagation, or other techniques. After the electronic device 101 builds the depth map queues 222 and image queues 221, the electronic device 101 can activate the region search operations for hole filling. In these embodiments, the electronic device 101 only stores two queues of the left virtual view and the right virtual view for the search operations (instead of storing two queues for each see-through camera 223 and 224). If more than two see-through cameras are used, the electronic device 101 can create additional queues.

As another example, when the electronic device 101 cannot find a best match patch from the image queues 221 as described above, the electronic device 101 fills the hole patch with color propagation from the neighboring pixels. The electronic device 101 uses a similar operation in depth map hole filling. When the electronic device 101 cannot find a best match region in the depth map queues 222, the electronic device 101 fills the hole region with depth propagation from the neighboring pixels. In one or more alternative embodiments, instead of using color propagation to fill the hole region, the electronic device 101 can use color inpainting to fill the hole region in filling the virtual view holes. Similarly, instead of using depth propagation to fill the hole patch, the electronic device 101 can use depth inpainting to fill the hole region in filling the virtual view depth maps.

Note that the operations and functions shown in or described with respect to FIGS. 2 through 9C can be implemented in an electronic device 101, 102, 104, server 106, or other device(s) in any suitable manner. For example, in some embodiments, the operations and functions shown in or described with respect to FIGS. 2 through 9C can be implemented or supported using one or more software applications or other software instructions that are executed by the processor 120 of the electronic device 101, 102, 104, server 106, or other device(s). In other embodiments, at least some of the operations and functions shown in or described with respect to FIGS. 2 through 9C can be implemented or supported using dedicated hardware components. In general, the operations and functions shown in or described with respect to FIGS. 2 through 9C can be performed using any suitable hardware or any suitable combination of hardware and software/firmware instructions.

Figure 10:
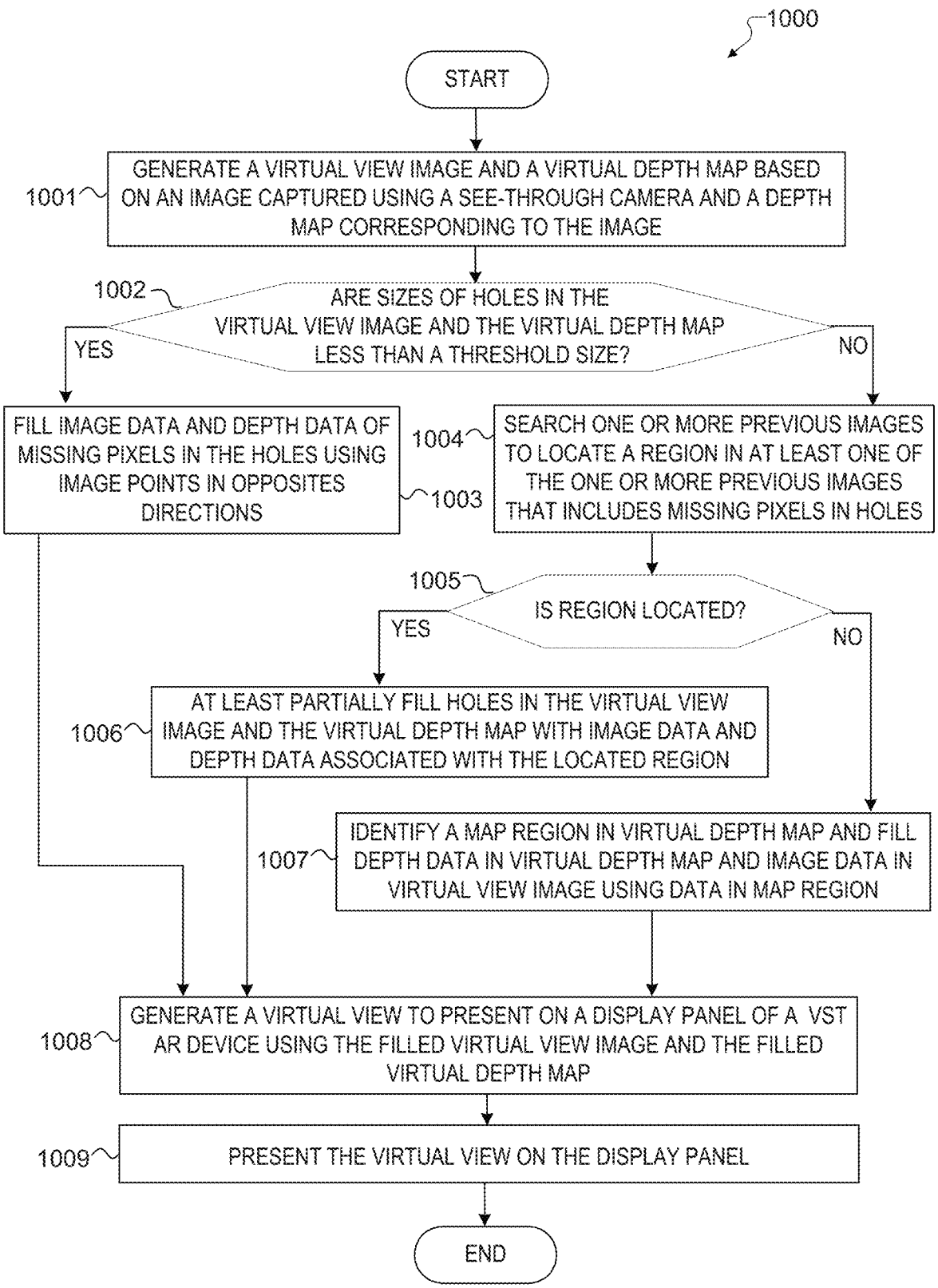
FIG. 10 illustrates an example method for disoccluded region completion for video rendering in VST AR according to this disclosure.

FIG. 10 illustrates an example method 1000 for disoccluded region completion for video rendering in video see-through augmented reality according to this disclosure. For ease of explanation, the method 1000 shown in FIG. 10 is described as involving the use of the process 200 shown in FIG. 2 and the electronic device 101 shown in FIG. 1. However, the method 1000 shown in FIG. 10 could be used with any other suitable process(es) and device(s).

As shown in FIG. 10, a virtual view image and a virtual depth map are generated based on an image captured using a see-through camera and a depth map corresponding to the image at step 1001. This could include, for example, the electronic device 101 generating a virtual view image 211 and a virtual depth map 212 based on an image 225 captured using one of the see-through cameras 223 and 224 and a depth map 226 corresponding to the image 225. The virtual view image and the virtual depth map include holes for which image data or depth data cannot be determined based on the image and the corresponding depth map.

It is determined if the sizes of the holes in the virtual view image and the virtual depth map are less than a threshold size at step 1002. This could include, for example, the electronic device 101 performing operation 236 to determine if the holes 601 are small holes. If the holes' size or sizes are less than the threshold size, image data and depth data associated with missing pixels in the holes are filled, such as by using an average of image and depth values of two image feature points in two opposite directions among eight directions (including north, northeast, east, southeast, south, southwest, west, and northwest), at step 1003. This could include, for example, the electronic device 101 performing the hole filling operation 250 for filling small holes.

If the holes' size or sizes are not less than the threshold size, one or more previous images captured using the see-through camera or another see-through camera are searched to locate a region in at least one of the one or more previous images that includes missing pixels in the holes at step 1004. This could include, for example, the electronic device 101 searching one or more previous images 225 in the image queues 221 to locate a reference region 604 that includes missing pixels in holes 601. It is determined if the region is located at step 1005. This could include, for example, the electronic device 101 determining if the reference region 604 was successfully located. If so, the holes in the virtual view image and the virtual depth map are at least partially filled with image data and depth data associated with the located region to generate a filled virtual view image and a filled virtual depth map at step 1006. This could include, for example, the electronic device 101 performing the operation 240 to at least partially fill the holes 601 with image data and depth data associated with the reference region 604. If not, a map region in the virtual depth map is identified at step 1007. The map region includes at least one of the holes and known pixels with known depth data. Depth data for each of the missing pixels in the virtual depth map is filled using the known depth data in the map region, and image data for each of the missing pixels in the virtual view image is filled using known image data in the map region. This could include, for example, the electronic device 101 performing the hole filling operation 270 using depth and color information from the map region.

A virtual view is generated for presentation on a display panel of a VST AR device using the filled virtual view image and the filled virtual depth map at step 1008. This could include, for example, the electronic device 101 performing operation 290 to generate a left virtual view, a right virtual view, or both for presentation on the display 160. Here, the electronic device 101 can be a VST AR device, and the display 160 can include a VST AR display panel. The display panel of the VST AR device presents the virtual view at step 1009. This could include, for example, the electronic device 101 presenting the virtual view on the display 160.

Although FIG. 10 illustrates one example of a method 1000 for disoccluded region completion for video rendering in video see-through augmented reality, various changes may be made to FIG. 10. For example, while shown as a series of steps, various steps in FIG. 10 could overlap, occur in parallel, occur in a different order, or occur any number of times.

As discussed above, the disclosed embodiments employ a pipeline with a combination of multiple hole filling operations. The disclosed embodiments can efficiently handle the cases of small holes and larger holes. In particular, the operation of hole filling with feature- and structure-guided hole filling can efficiently address small holes. The operation of filling holes for a virtual depth map or a virtual view image using one or more regions can efficiently address large holes with real information obtained directly from see-through cameras. The operation of filling holes in a virtual depth map with depth propagation and filling holes in a virtual view image with color propagation can efficiently address large holes with neighborhood information when real information is not available. Compared with conventional techniques that handle either small holes or larger holes (but not both), the disclosed embodiments can handle both small holes and large holes efficiently. In addition, the disclosed embodiments can be conveniently implemented on GPU computing in the rendering pipeline, which is important for reducing latency of the rendering pipeline.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   generating a virtual view image and a virtual depth map based on an image captured using a see-through camera and a depth map corresponding to the image, wherein the virtual view image and the virtual depth map include holes for which image data or depth data cannot be determined based on the image and the corresponding depth map;
   searching one or more previous images captured using the see-through camera or one or more other see-through cameras to locate a region in at least one of the one or more previous images that includes missing pixels in the holes;
   in response to locating the region, at least partially filling the holes in the virtual view image and the virtual depth map with image data and depth data associated with the located region to generate a filled virtual view image and a filled virtual depth map; and
   generating a virtual view to present on a display panel of a video see-through (VST) augmented reality (AR) device using the filled virtual view image and the filled virtual depth map.

2. The method of claim 1, further comprising:
presenting the virtual view on the display panel of the VST AR device.

3. The method of claim 1, wherein the one or more previous images are searched in response to widths of the holes being greater than a threshold number of pixels.

4. The method of claim 1, further comprising, in response to the region not being located:
- identifying a map region in the virtual depth map, the map region comprising at least one of the holes and known pixels with known depth data;
- filling depth data for each of the missing pixels in the virtual depth map using the known depth data in the map region; and
- filling image data for each of the missing pixels in the virtual view image using known image data in the map region.

5. The method of claim 4, wherein the image data for each missing pixel in the virtual view image comprises a weighted sum of the known image data in the map region with weights based on the virtual depth map.

6. The method of claim 4, wherein the depth data for each missing pixel in the virtual depth map is filled by minimizing a weighted sum of differences between depth at that missing pixel and depth at each of the known pixels in the map region.

7. The method of claim 1, further comprising:
in response to determining that widths of additional holes in the virtual view image and the virtual depth map are less than a threshold number of pixels, filling image data and depth data associated with missing pixels in the additional holes using an average of image and depth values of two image feature points in two opposite directions among eight directions including north, northeast, east, southeast, south, southwest, west, and northwest.

8. The method of claim 1, wherein each see-through camera is associated with a queue that stores the one or more previous images and one or more corresponding depth maps.

9. A video see-through (VST) augmented reality (AR) device comprising:
at least one display panel;
multiple see-through cameras; and
at least one processing device configured to:
- generate a virtual view image and a virtual depth map based on an image captured using one of the see-through cameras and a depth map corresponding to the image, wherein the virtual view image and the virtual depth map include holes for which image data or depth data cannot be determined based on the image and the corresponding depth map;
- search one or more previous images captured using the one of the see-through cameras or another of the see-through cameras to locate a region in at least one of the one or more previous images that includes missing pixels in the holes;
- in response to locating the region, at least partially fill the holes in the virtual view image and the virtual depth map with image data and depth data associated with the located region to generate a filled virtual view image and a filled virtual depth map; and
- generate a virtual view to present on the display panel using the filled virtual view image and the filled virtual depth map.

10. The VST AR device of claim 9, wherein the at least one processing device is further configured to control the display panel to present the virtual view.

11. The VST AR device of claim 9, wherein the at least one processing device is further configured to search the one or more previous images in response to widths of the holes being greater than a threshold number of pixels.

12. The VST AR device of claim 9, wherein the at least one processing device is further configured, in response to the region not being located, to:
- identify a map region in the virtual depth map, the map region comprising at least one of the holes and known pixels with known depth data;
- fill depth data for each of the missing pixels in the virtual depth map using the known depth data in the map region; and
- fill image data for each of the missing pixels in the virtual view image using known image data in the map region.

13. The VST AR device of claim 12, wherein the image data for each missing pixel in the virtual view image comprises a weighted sum of the known image data in the map region with weights based on the virtual depth map.

14. The VST AR device of claim 12, wherein the at least one processing device is further configured to fill the depth data for each missing pixel in the virtual depth map by minimizing a weighted sum of differences between depth at that missing pixel and depth at each of the known pixels in the map region.

15. The VST AR device of claim 9, wherein the at least one processing device is further configured, in response to determining that widths of additional holes in the virtual view image and the virtual depth map are less than a threshold number of pixels, to fill image data and depth data associated with missing pixels in the additional holes using an average of image and depth values of two image feature points in two opposite directions among eight directions including north, northeast, east, southeast, south, southwest, west, and northwest.

16. The VST AR device of claim 9, wherein each see-through camera is associated with a queue that stores the one or more previous images and one or more corresponding depth maps.

17. A non-transitory machine readable medium containing instructions that when executed cause at least one processor to:
- generate a virtual view image and a virtual depth map based on an image captured using a see-through camera and a depth map corresponding to the image, wherein the virtual view image and the virtual depth map include holes for which image data or depth data cannot be determined based on the image and the corresponding depth map;
- search one or more previous images captured using the see-through camera or one or more other see-through cameras to locate a region in at least one of the one or more previous images that includes missing pixels in the holes;
- in response to locating the region, at least partially fill the holes in the virtual view image and the virtual depth map with image data and depth data associated with the located region to generate a filled virtual view image and a filled virtual depth map, and
- generate a virtual view to present on a display panel of a video see-through (VST) augmented reality (AR) device using the filled virtual view image and the filled virtual depth map.

18. The non-transitory machine readable medium of claim 17, further containing instructions that when executed cause the at least one processor to control the display panel to present the virtual view.

19. The non-transitory machine readable medium of claim 17, wherein the instructions when executed cause the at least one processor to search the one or more previous images in response to widths of the holes being greater than a threshold number of pixels.

20. The non-transitory machine readable medium of claim 17, further containing instructions that when executed cause the at least one processor, in response to the region not being located, to:
- identify a map region in the virtual depth map, the map region comprising at least one of the holes and known pixels with known depth data;
- fill depth data for each of the missing pixels in the virtual depth map using the known depth data in the map region; and
- fill image data for each of the missing pixels in the virtual view image using known image data in the map region.

\* \* \* \* \*